US011206308B2

(12) United States Patent
Kreiner et al.

(10) Patent No.: US 11,206,308 B2
(45) Date of Patent: Dec. 21, 2021

(54) FACILITATING SUPPORT FUNCTIONALITIES THROUGH A SUPPORT APPLIANCE DEVICE IN ADVANCED NETWORKS

(71) Applicant: AT&T Intellectual Property I, L.P., Atlanta, GA (US)

(72) Inventors: Barrett Kreiner, Woodstock, GA (US); Ryan Schaub, Berkeley Lake, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/396,427

(22) Filed: Apr. 26, 2019

(65) Prior Publication Data
US 2020/0344304 A1 Oct. 29, 2020

(51) Int. Cl.
| | |
|---|---|
| *G06Q 30/00* | (2012.01) |
| *H04L 29/08* | (2006.01) |
| *H04N 7/18* | (2006.01) |
| *G02B 27/20* | (2006.01) |
| *G03B 17/08* | (2021.01) |
| *H04N 5/225* | (2006.01) |
| *H04W 12/06* | (2021.01) |

(52) U.S. Cl.
CPC ........... *H04L 67/141* (2013.01); *G02B 27/20* (2013.01); *G03B 17/08* (2013.01); *G06Q 30/016* (2013.01); *H04N 7/183* (2013.01); *H04N 5/2252* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 6,807,469 | B2 | 10/2004 | Funkhouser et al. |
| 6,826,512 | B2 | 11/2004 | Dara-abrams et al. |
| 7,149,936 | B2 | 12/2006 | Deshpande et al. |

(Continued)

FOREIGN PATENT DOCUMENTS

EP   2525307 B1   1/2018

OTHER PUBLICATIONS

"Visual Support" SightCall, sightcall.com, Mar. 19, 2015. 4 pages.

*Primary Examiner* — James A Edwards
(74) *Attorney, Agent, or Firm* — Amin, Turocy & Watson, LLP

(57) ABSTRACT

Facilitating support functionalities through a support appliance device in advanced networks (e.g., 4G, 5G, and beyond) is provided herein. A method can comprise facilitating, by a support appliance device comprising a processor, a dedicated communication link with a remote support entity via a secure internet connection. The method also can comprise, based on a receipt of a request for an active session, establishing, by the support appliance device, the active session with the remote support entity via the dedicated communication link. Further, the method can comprise receiving, by the support appliance device, input data associated with an item. The method also can comprise outputting, by the support appliance device, an indication on the item based on the support appliance device being in proximity of the item. An instruction related to the indication can be controlled by the remote support entity and implemented by the support appliance device.

20 Claims, 10 Drawing Sheets

(56) References Cited

U.S. PATENT DOCUMENTS

| | | |
|---|---|---|
| 7,668,912 B2 | 2/2010 | Nelson et al. |
| 7,739,078 B2 | 6/2010 | Ferchau |
| 8,040,234 B2 | 10/2011 | Ebrom et al. |
| 8,619,111 B2 | 12/2013 | Roach, Jr. |
| 8,645,014 B1 | 2/2014 | Kozlowski et al. |
| 8,769,038 B2 | 7/2014 | Montoya |
| 8,773,527 B2 | 7/2014 | Kang et al. |
| 8,804,941 B2 | 8/2014 | Werth et al. |
| 9,007,465 B1 | 4/2015 | Fontanez et al. |
| 9,010,624 B2 | 4/2015 | Kerscher et al. |
| 9,103,061 B2 | 8/2015 | Jeffery et al. |
| 9,560,203 B2 | 1/2017 | Kay et al. |
| 9,697,069 B2 | 7/2017 | Lee et al. |
| 10,147,096 B2 | 12/2018 | Soini et al. |
| 2001/0044826 A1* | 11/2001 | Ludwig .................. G06F 15/16 709/204 |
| 2002/0128875 A1 | 9/2002 | Parry |
| 2003/0190030 A1* | 10/2003 | Alton .................... H04W 76/38 379/219 |
| 2006/0113389 A1* | 6/2006 | Barkan ............. G06K 7/10732 235/462.21 |
| 2007/0155349 A1* | 7/2007 | Nelson ............. H02J 13/00006 455/128 |
| 2007/0252689 A1* | 11/2007 | Rothschild ............. H04L 67/12 340/539.13 |
| 2008/0105749 A1* | 5/2008 | Lei ..................... G06K 7/10722 235/462.42 |
| 2009/0244309 A1* | 10/2009 | Maison .................. A63F 13/213 348/222.1 |
| 2010/0027469 A1* | 2/2010 | Gurajala ............... H04M 15/68 370/328 |
| 2010/0328216 A1* | 12/2010 | Honda .................... G06F 3/038 345/163 |
| 2013/0007729 A1* | 1/2013 | Sirotkin .................. G06F 9/452 718/1 |
| 2013/0144558 A1* | 6/2013 | Hollis .................... B63C 11/02 702/187 |
| 2013/0188046 A1 | 7/2013 | Kong |
| 2014/0179222 A1 | 6/2014 | Chaudhary et al. |
| 2015/0127421 A1* | 5/2015 | Nakano .................. G06Q 30/01 705/7.29 |
| 2015/0302416 A1 | 10/2015 | DeCelles et al. |
| 2016/0112872 A1* | 4/2016 | McClement .......... H04W 12/06 455/411 |
| 2017/0264653 A1 | 9/2017 | Banyai et al. |
| 2018/0150129 A1* | 5/2018 | Thomas ..................... G06F 9/451 |
| 2018/0183840 A1* | 6/2018 | Lee ....................... H04W 76/10 |
| 2018/0278751 A1 | 9/2018 | Stepanian |
| 2018/0336087 A1 | 11/2018 | Bradley et al. |
| 2019/0020554 A1* | 1/2019 | Lilienthal ............... H04L 65/80 |
| 2019/0073884 A1* | 3/2019 | Payne ..................... G01R 1/20 |

\* cited by examiner

FACILITATING SUPPORT FUNCTIONALITIES THROUGH A SUPPORT APPLIANCE DEVICE IN ADVANCED NETWORKS

TECHNICAL FIELD

This disclosure relates generally to the field of mobile communication and, more specifically, to facilitating support functionalities through a support appliance device in advanced networks (e.g., 4G, 5G, and beyond).

BACKGROUND

When a problem is experienced with an appliance, a vehicle, a utility service, a lawn product, or any other product, and customer support is desired, a phone call is made to schedule a customer support personnel to visit the location where the problem is located (e.g., home, business, and so on). In some cases, an over-the-phone or over-the-Internet remote diagnostics can be attempted. Further, video chat can be attempted to obtain the support. However, such manners of obtaining support can be cumbersome and time-consuming. Further, in some cases, the support cannot be remotely obtained, requiring an in-person service call, resulting in further loss of time, as well as increased costs.

BRIEF DESCRIPTION OF THE DRAWINGS

Various non-limiting embodiments are further described with reference to the accompanying drawings in which.

DETAILED DESCRIPTION

Figure 1:
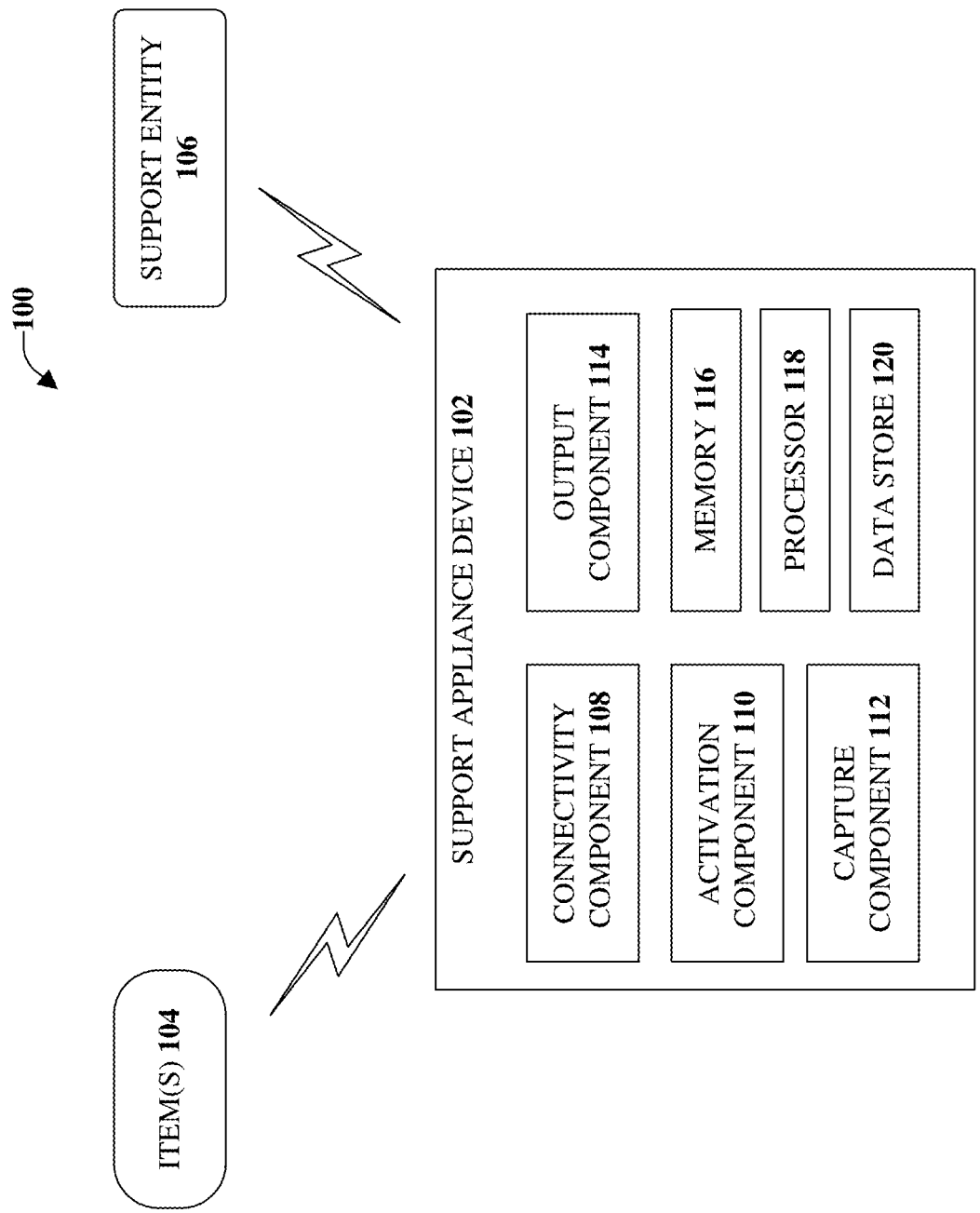
FIG. 1 illustrates an example, non-limiting, system that can facilitate support functionalities through a support appliance device in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate support functionalities through a support appliance device in advanced networks. More specifically described herein are aspects related to wireless communication systems and related to facilitating support functionalities through a support appliance device in advanced networks.

As mentioned, when a problem is experienced with an appliance, a vehicle, a utility service, a lawn product, or any other product or item, and customer support is desired, a phone call is made to schedule a customer support personnel to visit the location where the problem is located (e.g., home, business, and so on). In some cases, an over-the-phone or over-the-Internet remote diagnostics can be attempted. However, customer support in these situations can be difficult, especially for senior and/or disabled customers. For example, it can difficult to describe to the Customer Service Representative (CSR) what is being observed by the customer (e.g., user), what actions have been taken, and so on.

Video chat can be a natural progression and could be better than a phone call. However, video chat is still limited. For example, video chats utilize Wi-Fi or another network, which might not be available. In some cases, network access could be the actual problem or could be the cause of the problem being diagnosed. Further, in order to establish and use a video chat, the customer should be, at least somewhat, technical themselves, and can easily lead to frustration and dissatisfaction for both the customer and the CSR. Further, a video chat implies symmetric visual capabilities, which could be inappropriate. Additionally, to facilitate the video chat, the customer holds or works with a device (e.g., mobile phone or other device with camera capabilities), although the user might need to use their hands to perform a task related to the customer service issue.

Further issues include that support may need multiple people at substantially the same time, or sequentially. In addition, non-instrumented devices cannot be diagnosed. Another issue can be that a "rolling a truck" for service is expensive for both the company and the customer. Additionally, customers have become accustomed to simpler physical devices to reduce complexity.

The various aspects discussed herein provide a system that can allow for a "no setup," always-connected, and secure backhaul for supporting converged devices and/or other items. In an embodiment, provided is a method that can comprise facilitating, by a support appliance device comprising a processor, a dedicated communication link with a remote support entity via a secure internet connection. The method also can comprise, based on a receipt of a request for an active session, establishing, by the support appliance device, the active session with the remote support entity via the dedicated communication link. Further, the method can comprise receiving, by the support appliance device, input data associated with an item. The input data can facilitate an identification of the item. The method also can comprise outputting, by the support appliance device, an indication on the item based on the support appliance device being in proximity of the item. An instruction related to the indication can be controlled by the remote support entity and implemented by the support appliance device.

Facilitating the dedicated communication link can comprise facilitating the dedicated communication link upon initial activation of the support appliance device and prior to establishing the active session. Further to this implementation, facilitating the dedicated communication link can comprise establishing a preconfigured wireless connectivity with the remote support entity.

According to an implementation, the indication is a first indication and establishing the active session can comprise receiving a second indication that service associated with the item is requested and based on activation of a selector associated with a service request.

Outputting the indication can comprise, according to some implementations, determining, by the support appliance device, the proximity of the item to the support appliance device being within a defined proximity. Further, outputting the indication can comprise transmitting, by the support appliance device, a visible light on the item. The visible light can be an indication of feedback, from the remote support entity, and associated with the item.

According to some implementations, the request is a first request and receiving the input data associated with the item can comprise receiving an image of at least a portion of the item. The image can be received in response to a second request for details related to the item. Further, the second request can be received from the remote support entity.

According to another embodiment, provided is a support appliance device that can comprise a processor and a memory that stores executable instructions that, when executed by the processor, facilitate performance of operations. The operations can comprise communicatively coupling the support appliance device with a support entity via a dedicated communication link. The operations also can comprise providing an instruction to establish an active session with the support entity via the dedicated communication link based upon a determination that support services for the item are to be conducted. Further, the operations can comprise receiving input data associated with the item and conveying an indication to the item when the support appliance device is within line-of-sight of the item. The indication can be controlled by the support entity and implemented by the support appliance device.

According to an implementation, the operations can comprise a projector that outputs a visible light to the item. Further to this implementation, the visible light can be in response to feedback associated with the item and based on information received from the support entity. In some implementations, receiving input data associated with the item can comprise receiving input data from at least one of: a camera, a light, and a microphone.

The operations can comprise operatively connecting to the item to facilitate the support services. In an example, the support appliance device can comprise a flexible housing that encases the memory and the processor. Alternatively, or additionally, the support appliance device can comprise a dedicated support button and the operations can comprise preconfiguring the dedicated communication link with the support entity upon initial activation and prior to receipt of an instruction from the activation component.

In accordance with some implementations, the operations can comprise communicatively coupling the support appliance device with the support entity through a preconfigured wireless communication connectivity. In an example, the preconfigured wireless communication connectivity can comprise communication links configured to operate according to a fifth generation wireless network communication protocol. In another example, the preconfigured wireless communication connectivity can comprise communication links configured to operate according to a sixth generation wireless network communication protocol.

Another embodiment can relate to a device comprising a housing. The housing can comprise a processor and a memory that stores executable instructions that, when executed by the processor, facilitate performance of operations. The housing can also comprise a modem that facilitates a preconfigured wireless connection with an external source that provides a service related to an item. Further, the housing can comprise a selection button that, upon activation, establishes a dedicated communication link with the external source via the preconfigured wireless connection. The housing can also comprise a camera that captures an image of at least a portion of the item and a light emitting diode projector that provides visual feedback that is indicated directly on the item, wherein the visual feedback is controlled by the external source.

The housing can be waterproof and flexible. Further the camera can be configured to capture underwater images.

According to some implementations, the device can comprise a connector capable of being operatively connected to a power source and the item. When connected to the item, the connector can facilitate conveyance of diagnostic information to the external source. Further, removal of the connector from the item can physically interrupt remote access to the device by the external source.

Referring now to FIG. 1, illustrated is an example, non-limiting, system 100 that can facilitate support functionalities through a support appliance device 102 in advanced networks in accordance with one or more embodiments described herein. The system 100 can include the support appliance device 102, at least a first item 104 (e.g., a vehicle, a home appliance, a lawn care service (e.g., sod, fertilizer), a home warranty, and so on), and a support entity 106.

Aspects of the support appliance device 102, apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the support appliance device 102 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the support appliance device 102 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the support appliance device 102 can include a connectivity component 108, an activation component 110, a capture component 112, an output component 114, at least one memory 116, at least one processor 118, and at least one data store 120. The support appliance device 102 can be a stand-alone device, which can be dedicated for providing support functionalities as discussed herein. According to some implementations, the support appliance device 102 can be integrated, at least in part, with another device (e.g., a user equipment device (UE)).

The support appliance device 102 can be configured to facilitate support functionalities for at least the item 104 (e.g., a vehicle, a home appliance, a lawn care service, a home warranty, and so on). In some implementations, the support appliance device 102 can be dedicated to provide support functionalities for a single item though connectivity with at least one support entity 106. However, the disclosed aspects are not limited to this implementation and the support appliance device 102 can provide support functionalities for two or more items, even if items of the two or more items are supported by different support entities (e.g., different customer support services). The at least one support entity 106 can be located remote from the support appliance device 102 (e.g., at a different geographic location).

The connectivity component 108 can communicatively couple the support appliance device 102 and the at least one support entity 106. For example, the connectivity component 108 can be communicatively coupled with the support entity 106 through a preconfigured wireless communicative connectivity. The preconfigured wireless connectivity can be established by the connectivity component 108 with little, if any, interaction by a user of the support appliance device 102.

In an example, the wireless communicative connectivity can be through various wireless technologies including, but not limited to LTE, 5G, 6G, and other advanced networks. According to a specific, non-limiting, example, the preconfigured wireless communication connectivity can comprise communication links configured to operate according to a fifth generation wireless network communication protocol. According to another specific, non-limiting, example, preconfigured wireless communication connectivity comprises communication links configured to operate according to a sixth generation wireless network communication protocol.

The activation component 110 can facilitate establishment of the communication between the support appliance device 102 and the support entity 106 via the connectivity component 108. For example, the activation component 110 can be a selector that, when selected, instructs the connectivity component 108 to establish a communication link with the support entity 106. In some implementations, the activation component 110 can be, or can enable, a selector button located within a housing of the support appliance device 102. For example, the selector button can be a button or other element that can be depressed in order to activate (e.g., turn on) the support appliance device 102, a toggle switch, another element that can be changed from an "off" state to an "on" state, and/or another element that can be manually selected by a user of the support appliance device 102 in order to obtain support from the support entity. In accordance with some implementations, the selector button can be a software enable switch that can be activated though means of a touch screen, a keyboard (button(s)), a computer mouse (button(s)), verbal activation, visual activation (e.g., tracking eye movement, tracking hand gestures), and so on.

The capture component 112 can obtain information about the item 104. For example, the capture component 112 can be, or can access, one or more cameras or other devices that can capture an image of at least a portion of the item 104. According to some implementations, the one or more cameras can be positioned to obtain the image (or more than one image) of the item 104. According to some implementations, the capture component 112 can be associated with a microphone that can capture audio signals (e.g., a sound made by a vehicle and/or an appliance).

According to some implementations, the output component 114 can be configured to render or project one or more visible indications (e.g., based on being within line-of-sight of the item). For example, the output component 114 can provide a beam of light which can indicate a portion of the item. According to an example, the beam of light can be a laser beam that points to at least a portion of the item. For example, the output component 114 can receive an instruction from the support entity 106 to provide the output data.

The at least one memory 116 can be operatively connected to the at least one processor 118. The at least one memory 116 can store executable instructions that, when executed by the at least one processor 118 can facilitate performance of operations. Further, the at least one processor 118 can be utilized to execute computer executable components stored in the at least one memory 116.

For example, the at least one memory 116 can store protocols associated with facilitating support functionalities through a support appliance device in advanced networks as discussed herein. Further, the at least one memory 116 can facilitate action to control communication between the support appliance device 102 and the support entity 104, other devices, and/or other entities, such that the support appliance device 102 can employ stored protocols and/or algorithms to achieve improved communications while facilitating support functionalities in a wireless network as described herein.

It should be appreciated that data store components (e.g., the at least one memory 116, the at least one data store 120) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 118 can facilitate respective analysis of information related to facilitating support functionalities through a support appliance device in advanced networks. The at least one processor 118 can be a processor dedicated to analyzing and/or generating information received, a processor that controls one or more components of the support appliance device 102, and/or a processor that both analyzes and generates information received and controls one or more components of the support appliance device 102.

According to some implementations, the components of the support appliance device 102 can be contained within a housing. For example, the housing can be waterproof. Further, the housing can be flexible, allowing at least the capture component 112 to be moved into various positions in order to capture data related to the item 104. In a non-limiting example, the capture component 112 can be a camera that can be configured to capture underwater images.

Figure 2:
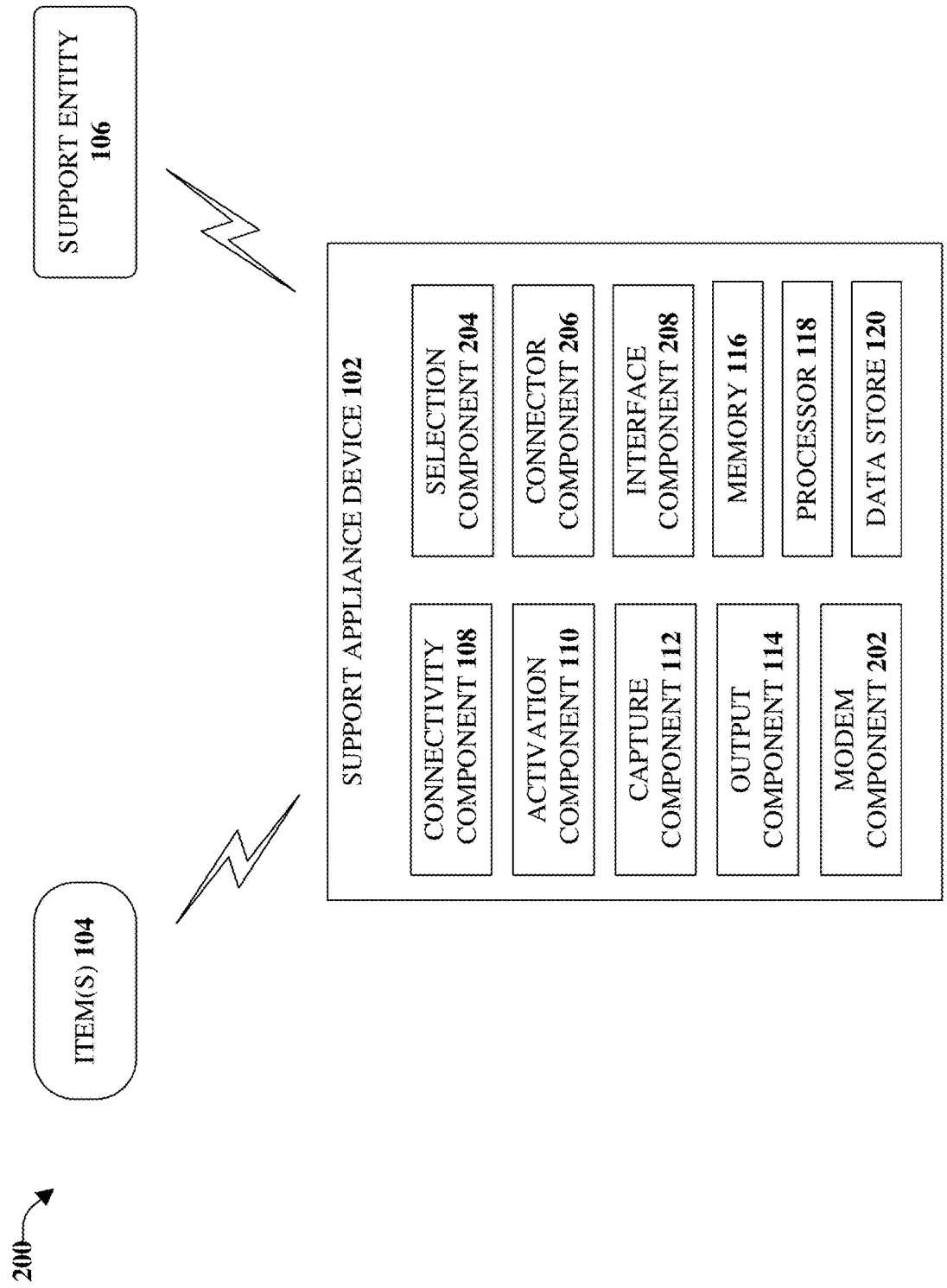
FIG. 2 illustrates another example, non-limiting, system that facilitates automatic support functionalities in accordance with one or more embodiments described herein.

FIG. 2 illustrates another example, non-limiting, system 200 that facilitates automatic support functionalities in accordance with one or more embodiments described herein. Repetitive description of like elements employed in other embodiments described herein is omitted for sake of brevity. The system 200 can comprise one or more of the components and/or functionality of the system 100 and vice versa.

The support appliance device 102 can comprise a modem (e.g., a modem component 202) that can facilitate a preconfigured wireless connection with an external source that provides a service related to an item (e.g., the support entity 104).

Also included can be a selection component 204 that, upon activation, can establish a dedicated communication link with the external source (e.g., the support entity 106) via the preconfigured wireless connection. According to some implementations, the selection component 204 can be a button (e.g., a manual button, a software button) that can be selected by a user in order to initiate a support session (and/or end the support session).

The capture component 112, according to some implementations, can be a camera that captures an image of at least a portion of the item 104. Further, in some implementations, the output component 114 can be a light emitting diode projector that provides visual feedback that is indicated directly on the item. The visual feedback can be controlled by the external source.

Further, the support appliance device 102 can comprise a connector (e.g., a connector component 206) that can be capable of being operatively connected to a power source and/or the item. When connected to the item, the connector component 206 can facilitate conveyance of diagnostic information to the external source. For example, the connector component 206 can be a USB port that can be attached to a device and can derive power from the device. Upon or after initiation of a support session, the USB port can be removed from the device and attached to the item 104 for which support is sought. During the support session, information can be received from and/or communicated to the item 104 based on the connection by the connector component 206. According to some implementations, removal of the connector component 206 from the item 104 physically interrupts remote access to the device by the external source.

In addition, the support appliance device 102 can comprise an interface component 208 that can facilitate communication between a user and the support appliance device 102, as well as between the user and the support entity 106. For example, the interface component 208 can provide an interface through which the user can provide information (e.g., verbal, audible, visual, and so on). Further, the user can receive data through the interface component 208. For example, the user can be instructed to move the support appliance device 102 near the item 104 (e.g., within a defined proximity of the item 104) and angle the support appliance device 102 such that the capture component 112 can obtain one or more images, for example, of at least a portion of the item 104.

According to some implementations, the interface component 208 (as well as other interface components discussed herein) can provide a Graphical User Interface (GUI), a command line interface, a speech interface, Natural Language text interface, and the like. For example, a GUI can be rendered that provides an entity (e.g., the user) with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 3:
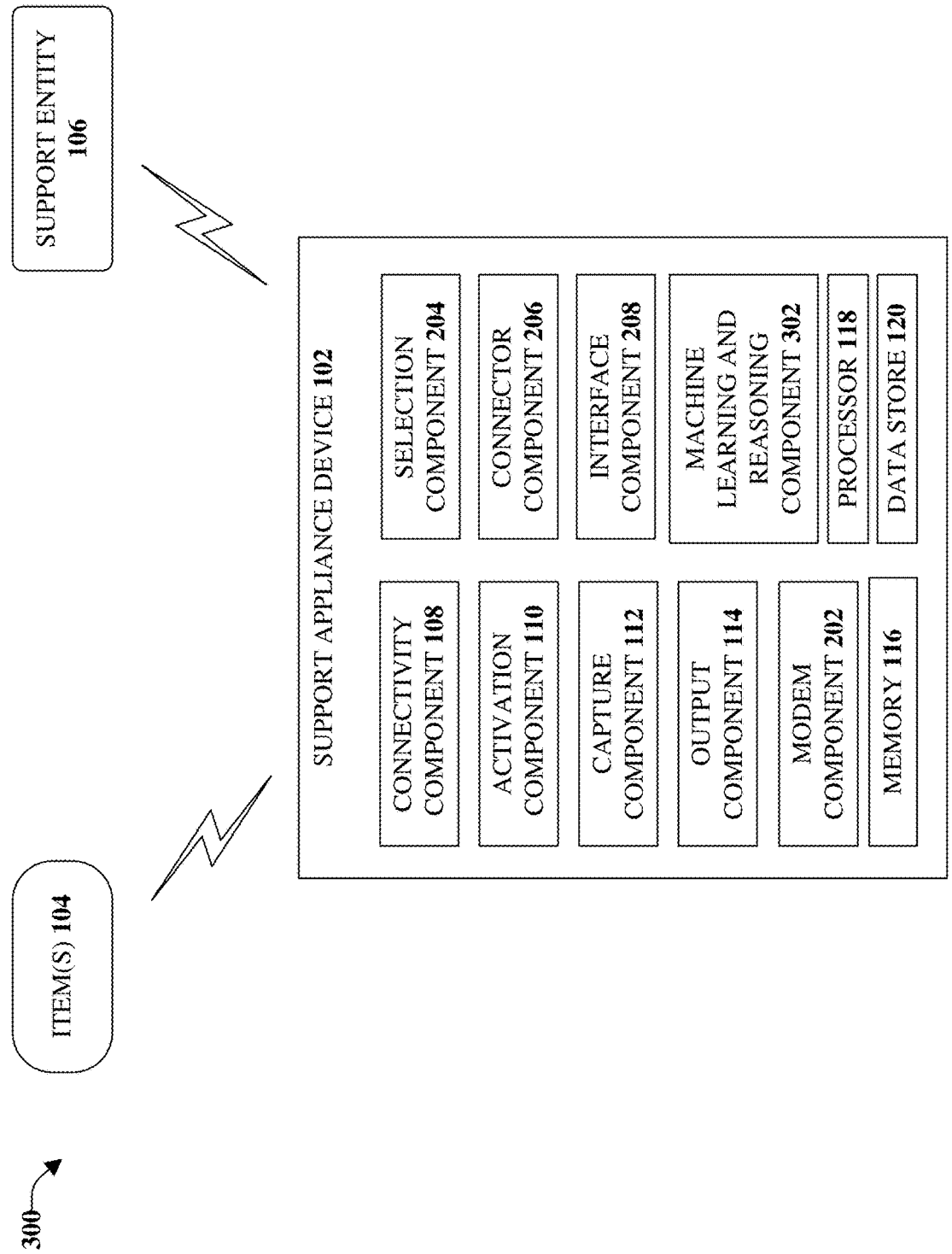
FIG. 3 illustrates an example, non-limiting, system that employs automated learning to facilitate one or more of the disclosed aspects in accordance with one or more embodiments described herein.

FIG. 3 illustrates an example, non-limiting, system 300 that employs automated learning to facilitate one or more of the disclosed aspects in accordance with one or more embodiments described herein. Repetitive description of like elements employed in other embodiments described herein is omitted for sake of brevity. The system 300 can comprise one or more of the components and/or functionality of the system 100, the system 200, and vice versa.

As illustrated, the support appliance device 102 can comprise a machine learning and reasoning component 302 that can be utilized to automate one or more of the disclosed aspects. The machine learning and reasoning component 302 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 302 can employ principles of probabilistic and decision theoretic inference. Additionally, or alternatively, the machine learning and reasoning component 302 can rely on predictive models constructed using machine learning and/or automated learning procedures. Logic-centric inference can also be employed separately or in conjunction with probabilistic methods.

The machine learning and reasoning component 302 can infer intention of a request for service (e.g., identification of an item for which service is desired, identification of a problem or issue with respect to the item, and so on) by obtaining knowledge about the possible items, associated functions, and knowledge about what the user is trying to accomplish based on items associated with the users and/or being utilized by the user, the environmental context, the user context, or combinations thereof. Based on this knowledge, the machine learning and reasoning component 302 can make an inference based on which actions to implement, which items to reference, which service entity to contact, other service entities to employ, changes to selections received from the user (e.g., changes to an item identity, changes to an item issue needing service), or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific item, context, or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

If the machine learning and reasoning component 302 has uncertainty related to the intent or request, the machine learning and reasoning component 302 can automatically engage in a short (or long) dialogue or interaction with the user (e.g., "What do you mean?"). In accordance with some aspects, the machine learning and reasoning component 302 engages in the dialogue with the user through another system component. Computations of the value of information can be employed to drive the asking of questions. Alternatively, or additionally, a cognitive agent component (not shown) and/or the machine learning and reasoning component can anticipate a user action (e.g., "what item needs service?") and continually, periodically, or based on another interval, update a hypothesis as more user actions are gathered. The cognitive agent component can accumulate data or perform other actions that are a result of anticipation of the user's future actions.

The various aspects (e.g., in connection with receiving one or more selections, determining the meaning of the one or more selections, distinguishing a selection from other actions, implementation of selections to satisfy the request, and so forth) can employ various artificial intelligence-based schemes for carrying out various aspects thereof. For example, a process for determining if a particular action is a request for an action to be performed or a general action (e.g., an action that the user desires to perform manually) can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine what item needs service to be automatically performed. In the case of items, for example, attributes can be identification of a model and/or a serial number and the classes are criteria of the item and/or item that need to be serviced to satisfy the request.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing user behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining, according to a predetermined criterion, when to implement a service action, which action to implement, what requests to group together, relationships between requests, which service entity to utilize, and so forth. The criteria can include, but is not limited to, similar requests, historical information, and so forth.

Additionally, or alternatively, an implementation scheme (e.g., a rule, a policy, and so on) can be applied to control and/or regulate requests and resulting actions, inclusion of a group of service entities to carry out actions associated with the requests, privileges, and so forth. In some implementations, based upon a predefined criterion, the rules-based implementation can automatically and/or dynamically interpret requests. In response thereto, the rule-based implementation can automatically interpret and carry out functions associated with the request by employing a predefined and/or programmed rule(s) based upon any desired criteria.

Figure 4:
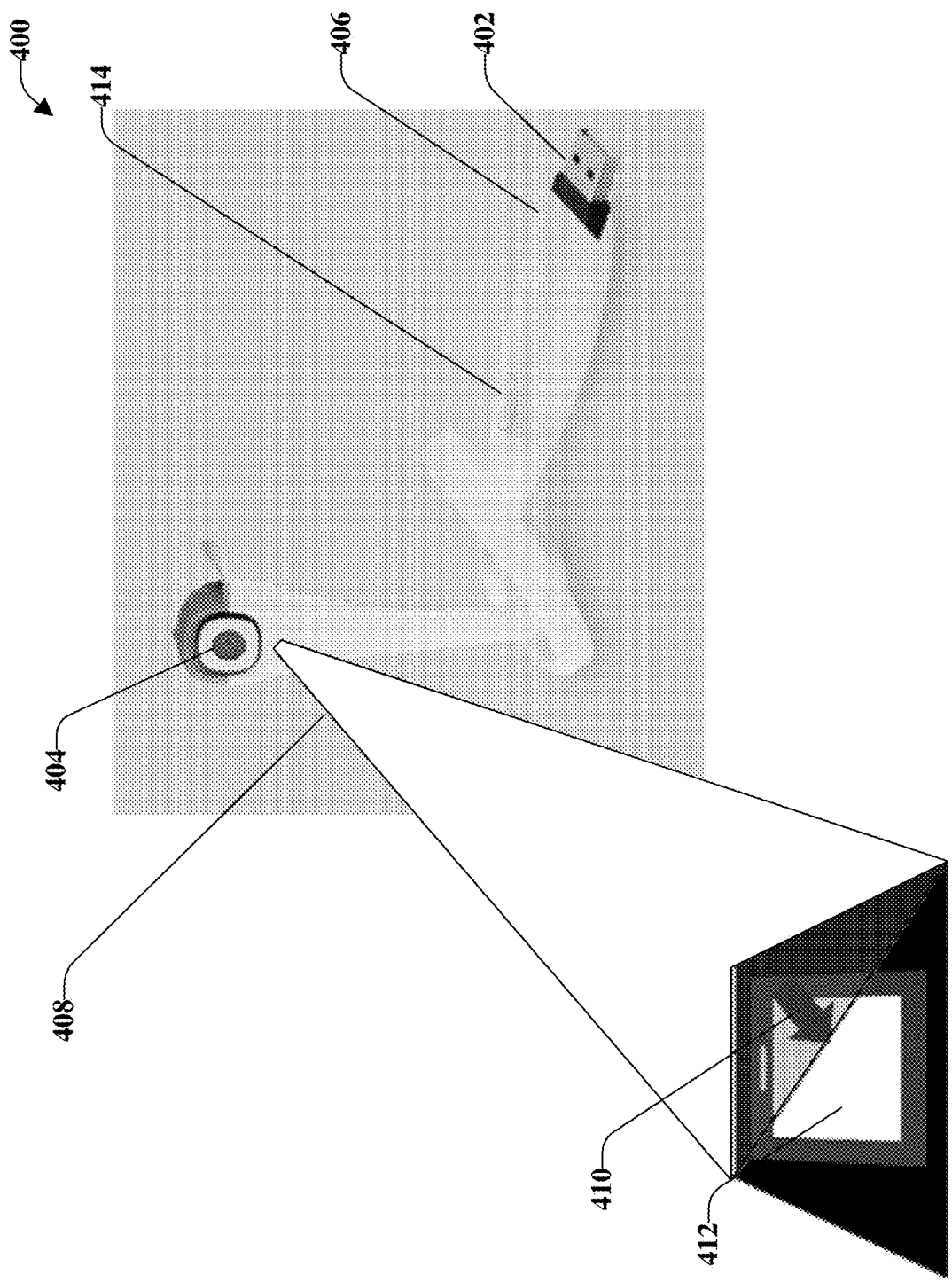
FIG. 4 illustrates an example, non-limiting, example device in accordance with one or more embodiments described herein.

FIG. 4 illustrates an example, non-limiting, example device 400 in accordance with one or more embodiments described herein. Repetitive description of like elements employed in other embodiments described herein is omitted for sake of brevity. The customer support device 400 can comprise one or more of the components and/or functionality of the system 100, the system 200, the system 300, and vice versa.

The device 400 can be an end user dedicated customer service device according to some implementations. It is noted that although a specific implementation of a device is shown and described, the disclosed aspects are not limited to this example. Instead, the device can take other forms than the one illustrated in FIG. 4.

The device 400 can comprise various features including, but are not limited to a preconfigured wireless (e.g., LTE, 5G, 6G, and so on) connectivity requiring either no or very limited user interaction (e.g., via the connectivity component 108). For example, user interaction can include powering on and/or powering off the device. Since wireless connectively can be preconfigured, the user interaction does not need to include obtaining internet (or other) connectivity.

Another feature of the device 400 can include a USB connection 402 (e.g., the connector component 206). The USB connection 402 can be for connectivity and/or power. For example, the USB connection 402 can be operatively coupled to a device for electrical power. Further, the USB connection 402 can be operatively coupled to an item (e.g., the item 104) in order to facilitate support functionalities as discussed herein.

Further, a flexible "snake light" camera (e.g., with privacy shutter), speaker, microphone 404 (e.g., capture component 112) can be included as one or more device components. Although illustrated at a single location on the device, the camera, speaker, microphone and/or the like can be located at another location and/or at different locations on the device 400 (e.g., microphone can be located at a first location on the device, a camera at a second location, and so on). Further, more than one capture component can be included on the device (e.g., two or more cameras, two or more microphones, two or more lights, and so on).

The device 400 can also include local computer, memory, and/or storage 406 (e.g., the at least one memory 116, the at least one processor 118, and/or the at least one data store 120). According to some implementations, the device can comprise a rechargeable battery with (or without) a battery life indicator. The battery (or more than one battery) can be recharged via the USB connection 402, for example.

Also included in the device 400 can be a LED projector 408 (e.g., the output component 114). The LED projector 408 can output a light or other visual indicator on the item 104. For example, the visual indicator can bring attention to at least a portion of the item. In a specific example, the support entity 106 can instruct the LED projector 408 output a light and circle a dial on the item 104, which can indicate to a user which dial should be moved by the user. As illustrated, the visual indicator can be an arrow 410 pointing to a computer screen 412.

In addition, the device 400 can include a dedicated support call button 414 (e.g., the activation component 110). According to some implementations, the dedicated support call button 414 can include a mute feature. In some implementations, the dedicated support call button 414 can facilitate the transfer of video, audio, and the like between a user of the device 400 and a support entity 106 (e.g., via the interface component 208).

In some implementations, the device 400 can be proactively distributed to the end user as part of a support package related to one or more items. For example, the device 400 can be distributed as part of warranty coverage.

One customer service device (e.g., the device) can potentially provide support to any item or appliance in the home (and/or other location). Therefore, a device that has been distributed for one item can be extended to another item (or more than one other item). For example, the new service can be "added on" to the service offered through the device 400. For example, the item associated with the new service can be identified through a 2D code, a 3D code, a QR code, OCR, and so on. In some cases, the item can be added through interaction with the device 400, such as using the dedicated support call button 414 to contact the support entity 104 and obtain support for the new item. According to some implementations, the item can be added during a purchase of the item.

Some device support may need an "adapter" which can connect to the USB port (e.g., the USB connection 402).

Some potential adapters include, but are not limited to: OBIEE/2 for car diagnostics, snake camera for plumbing, environmental sensors such as heat, humidity, impact, or specialty network, and so on.

When support is needed, the end user can press the dedicated call button (e.g., the dedicated support call button 414). Devices can be configured at the need of the customer (e.g., end user). The support entity 106 can comes on the line to identify what the support request is, and routes the request to the appropriate group. With end user permission, the support entity 106 can observe the local environment via the camera and microphone. The end user may be instructed to point the camera at the item to be serviced.

Feedback as to the view can be provided by the support entity 106 verbally, or, using the LED projector 408, projecting a bounding box the user can use to guide the view, or through other perceivable means. The support entity 106 can observe the device indications and can use the LED projector to indicate to the user what action the user should perform. For example, the support entity 106 can instruct the LED projector to draw an arrow/circle on the screen and the LED projector outputs the arrow/circle on the device.

For support/services of "computing" devices the support entity 106 can request the user to connect the support device to the item being serviced. The connection can be enabled through the USB connection 402. The item can be visible as a USB hub to the compute device, creating external keyboard, mouse, and storage devices, potentially a USB connected display as well. The support entity 106 can remotely control these items via the LTE/5G/6G network as if they were on-site. The support entity 106 can also guide the end user to point the camera at the screen providing them with a local view.

If the support request requires files to be installed on the item, the CSR can locate the files and transmit them over the LTE/5G/6G network to the support device, which appears to the end user's device as storage. They can then use the HUD devices to perform the installation for the end user as if they were on-site.

The end user can observe this behavior in real time, with the support entity 106 having a two-way discussion with the end user while in process. If there is any concern, the end user can remove the support device from their equipment (e.g., disconnect the USB connection 402 from the item). The connection with the support entity 106 is not lost, only the physical connection to the item.

In addition, mobile, Internet of Things (IoT), or other compute-enabled devices that do not have a USB can also be supported by the device 400. Further, support can be provided with the device 400 for non-compute-enabled devices such as appliances, vehicles, or infrastructure (power, water, gas). Alternatively, or additionally, the user can place the device in view of the camera, as discussed above. For example, a stand (e.g., a tripod) can be provided to allow the camera to be hands free.

According to some implementations, physical buttons, screen touches, and other activities can be guided by the support entity 106 verbally or via the LED projector. The support entity 106 (e.g., a user at the support entity 106) can "draw" on their local screen to create equivalent projection at the end user's device.

For support of wireless networking issues, the device can have built-in Wi-Fi and Bluetooth, and by definition 6G/5G/LTE, which can be used to do "site surveys" of the local network/devices, potentially allowing the support entity 106 to instruct the support device to connect to the local network to diagnose it, but without being dependent on it.

For all cases, the support entity 106 can also observe any physical issues that are not otherwise detectable remotely. Such physical issues include, but are not limited to, a blank/damaged display, unusual environmental sounds (e.g., fans, disks), no power on, and so on. These physical issues can be observed through the camera, microphone, and/or other capture component.

Various benefits can be provided with the disclosed aspects. For example, immediate, reliable, trusted connection to support can be enabled. Further, the support device can be trusted both by the end user and the entity (e.g., company) using the support device to provide the service.

Further opportunities for hardware hacking, software modifications, or sideloaded applications can be reduced and/or mitigated with the device 400. For example, the user is always in control of the device (e.g., can disconnect the device, can disconnect the USB connection 402). The device can be turned off, or physically removed. Further, a secure support channel can be enabled by the device 400. CSR affiliation with the customer is not "lost" when using the device. In addition, since the device 400 is always connected, there is no "reconnect" time. Secure on-demand file transfer when required for support can be enabled. The support entity 106 can have full connectivity/experience via, for example, a keyboard, a mouse, and/or video. Further, the device can be used to diagnose network devices without the network being operational.

Additional features can include that the system can provide full documentation of the support action, including a visual record of the problem and the solution affected by the user. Automated registration of the device to the user can also be enabled. A single device (e.g., the device 400) can support multiple technology devices (e.g., computers, smart TVs, cable boxes, some phones, routers, IoT devices). As mentioned, the device 400, via the USB connector, can connect to most items directly via USB.

Further, a user and/or companies can access the device as a service. Fees, if any, can be accessed via the device provider and/or the network utilization. In addition, the device housing can be various designs, including a "future resistant" design.

The device can be used to diagnose other devices (e.g., items) that may not be technology enabled, or not USB enabled. Such devices include, but are not limited to: washer, dryer, dishwasher, appliances, other mobile devices, drones, and so on. Other devices can also include power, smart light bulbs, outdoor tools. The device can be used to provide feedback on receipt of shipped products during "unboxing" and provide proof of [damaged] receipt.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
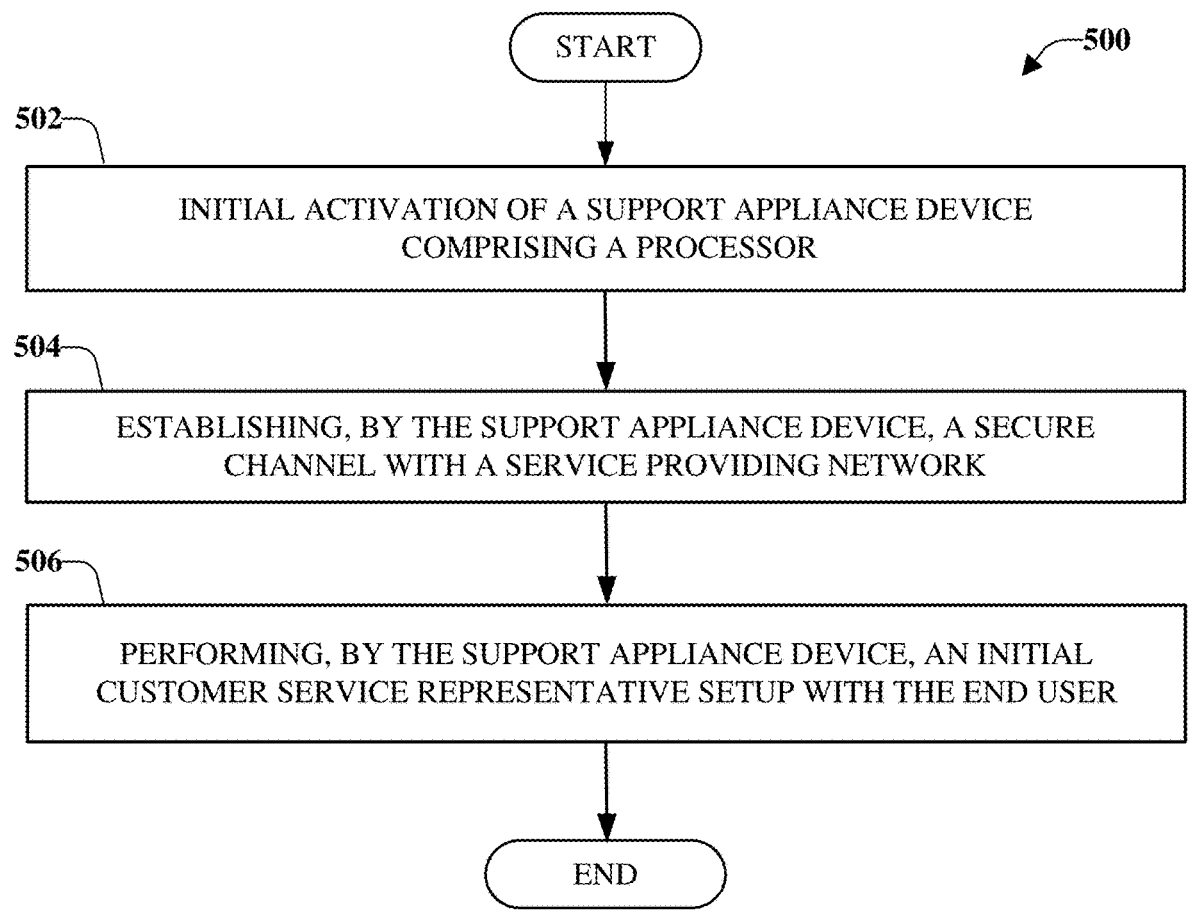
FIG. 5 illustrates a flow diagram of an example, non-limiting, computer-implemented method for facilitating usage of a support appliance device in accordance with one or more embodiments described herein.

FIG. 5 illustrates a flow diagram of an example, non-limiting, computer-implemented method 500 for facilitating usage of a support appliance device in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

The computer-implemented method 500 can start, at 502, with initial activation of the support appliance device (e.g., the support appliance device 102). For example, initial activation can occur when the support appliance device is installed or made ready for use. According to some implementations, the initial activation can occur at a location where the support appliance device will be used (e.g., in a home or other location, near an appliance covered under a warranty, an extended warranty, or another service contract). According to some implementations, the support appliance device could be intended for use at multiple locations, which could be in different geographical areas.

Upon or after initial activation, at 504 of the computer-implemented method 500, the support appliance device can establish a secure channel with the service providing network. For example, the secure channel can be established by the support appliance device via LTE, 5G, 6G, and/or another advanced network.

Further, at 506 of the computer-implemented method 500, the support appliance device can perform an initial CSR (e.g., the support entity 106) setup with the end user. The initial CSR setup can identify the end user and/or items (e.g., the item 104) for which support is being registered. According to some implementations, two-Dimensional (2D), three-Dimensional (3D), or other Quick Response (QR) codes, registration sticker, Optical Character Recognition (OCR), or the like can be utilized to facilitate the identification of the items for which support is being registered.

According to some implementations, the support appliance device can be connected to a power source. For example, the power source can be a USB charging device, with or without a host device. When not in use, the support appliance device does not "client" to the host device if it is a compute device. Although discussed with respect to a USB charging device, the disclosed aspects are not limited to this implementation. Instead, other power sources can be utilized with the disclosed aspects.

Figure 6:
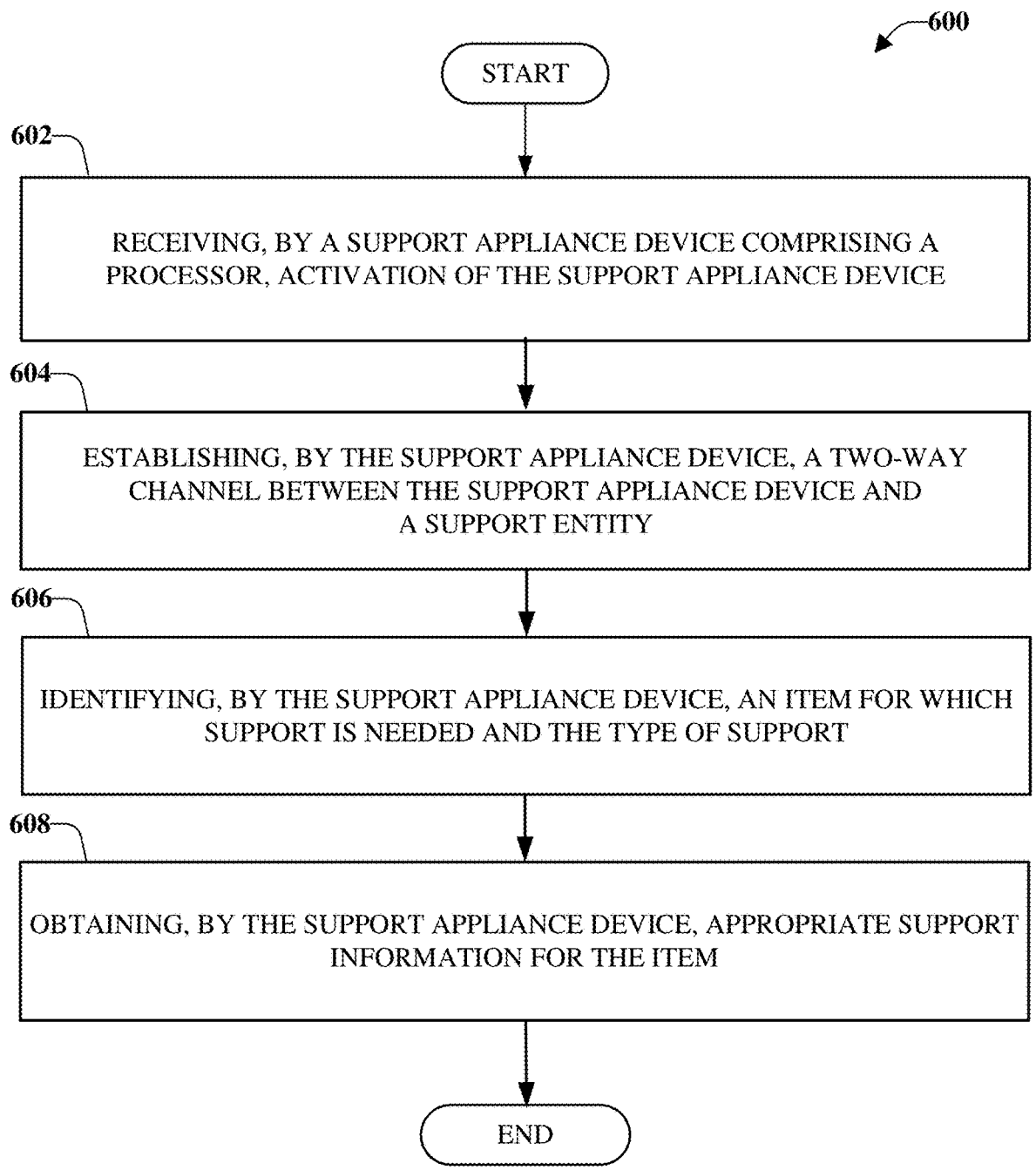
FIG. 6 illustrates a flow diagram of an example, non-limiting, computer-implemented method for providing support functionalities through a support appliance device in accordance with one or more embodiments described herein.

FIG. 6 illustrates a flow diagram of an example, non-limiting, computer-implemented method 600 for providing support functionalities through a support appliance device in accordance with one or more embodiments described herein.

Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600 an activation of a support appliance device (e.g., the support appliance device 102) is received. The activation can be based on receipt of selection of a dedicated button or other means of selection in order to summon a support entity.

Upon or after activation of the support appliance device is received, at 604 of the computer-implemented method 600, a two-way channel can be established between the support appliance device and a support entity (e.g., the support entity 106). The two-way channel can be a two-way voice channel, for example.

At 606 of the computer-implemented method 600, identification can be made of an item for which support is needed and the type of support. For example, the identification can be made automatically (e.g., via the machine learning and reasoning component 302) based on information received (e.g., via the capture component 112). According to some implementations, the information can be received based upon one or more capture components receiving information related to an item. For example, a camera can be positioned to obtain an image of the item. According to some implementations, audible information can be received that indicates the item (e.g., a user talking into a microphone). In some implementations, the identification of the item can be made by the support entity 104 automatically and/or based on other data.

In some implementations, upon or after the item and appropriate support is identified, the computer-implemented method 600 can, at 608, obtain the appropriate support information. For example, the support information can be received from the support entity. According to some implementations, the support entity can access the appropriate support information from one or more internal and/or external data stores. Alternatively, or additionally, the support entity can obtain the information from another support entity and/or can transfer the active session to the other support entity such that the other support entity can directly provide the information to the support appliance device. According to some implementations, the support appliance device can be removed from a charger and connected to the item needing support.

Figure 7:
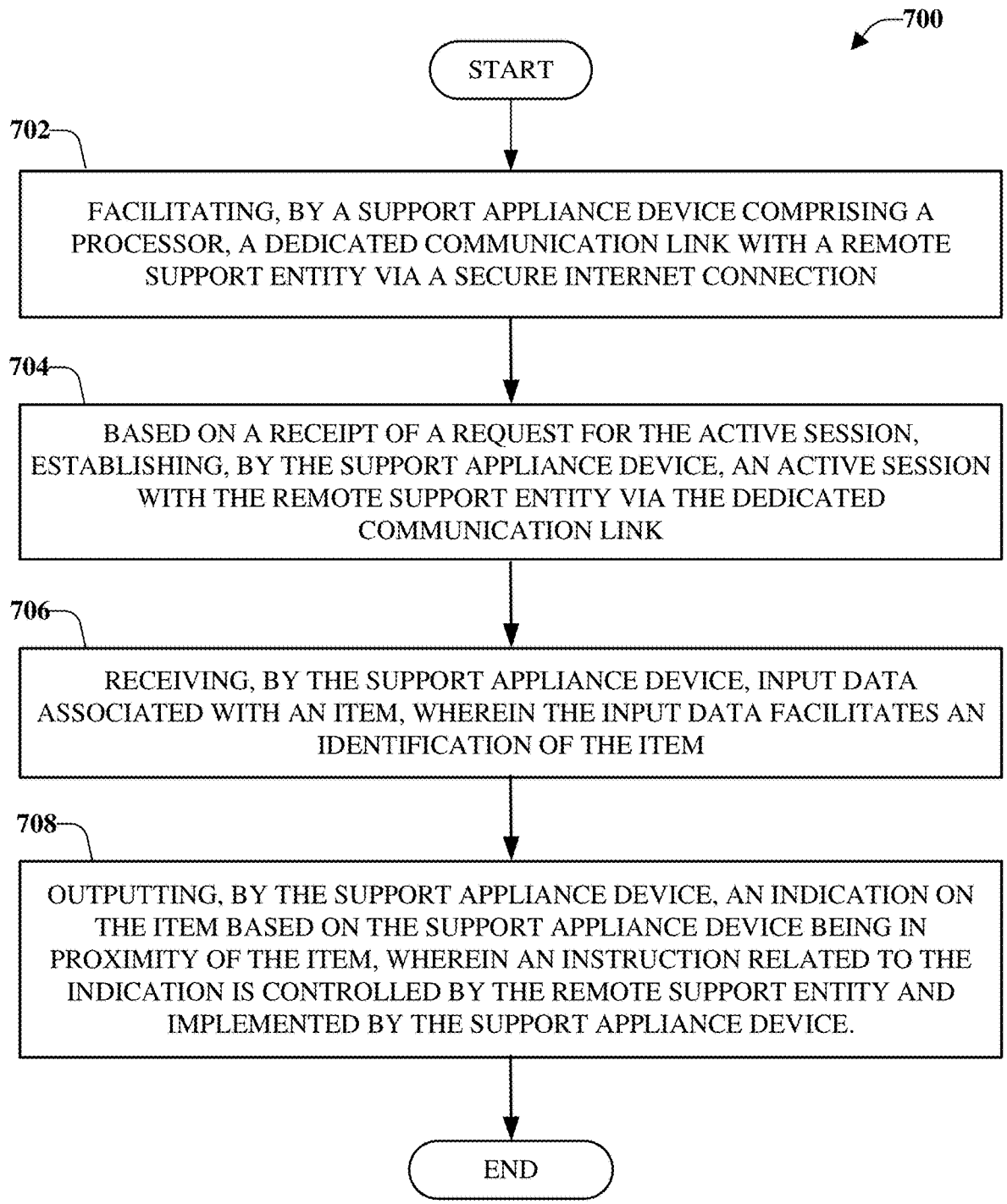
FIG. 7 illustrates a flow diagram of an example, non-limiting, computer-implemented method for providing support functionalities through a support appliance device in accordance with one or more embodiments described herein.

FIG. 7 illustrates a flow diagram of an example, non-limiting, computer-implemented method 700 for providing support functionalities through a support appliance device in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

The computer-implemented method 700 starts, at 702, when a support appliance device comprising a processor facilitates a dedicated communication link with a remote support entity via a secure internet connection (e.g., via the connectivity component 108). For example, facilitating the dedicated communication link can comprise facilitating the dedicated communication link upon initial activation of the support appliance device and prior to establishing an active session. According to another example, facilitating the dedicated communication link can comprise establishing a pre-configured wireless connectivity with the remote support entity.

At 704, the support application device can, based on a receipt of a request for the active session, establish an active session with the remote support entity via the dedicated communication link (e.g., via the activation component 110). In an example, establishing the active session can comprise receiving an indication that service associated with the item is requested and based on activation of a selector associated with a service request.

The support appliance device can receive, at 706 of the computer-implemented method 700, input data associated with an item (e.g., via the capture component 112). The input data can facilitate an identification of the item. According to some implementations, the input data can facilitate identification of a service needed for the item.

In an example, receiving the input data associated with the item can comprise receiving an image of at least a portion of the item. The image can be received in response to a request for details related to the item. The request can be received from the remote support entity.

According to another example, the input data can include a geographic location (e.g., a geolocation). For example, services supported by the support appliance device can be related to a home warranty. Accordingly, items within the home can be serviced and authentication of the items can be based on a location of the item (or a location of the support appliance device).

Further at 708 of the computer-implemented method 700, the support appliance device can output an indication on the item based on the support appliance device being in proximity of the item (e.g., via the output component 114). An instruction related to the indication can be controlled by the remote support entity and implemented by the support appliance device.

According to some implementations, outputting the indication on the item can comprise determining, by the support appliance device, the proximity of the item to the support appliance device being within a defined proximity. Further, outputting the indication on the item can comprise transmitting, by the support appliance device, a visible light on the item, wherein the visible light is an indication of feedback, from the remote support entity, and associated with the item.

Described herein are systems, methods, articles of manufacture, and other embodiments or implementations that can facilitate support functionalities through a support appliance device in advanced networks. Facilitating support functionalities through a support appliance device in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 8:
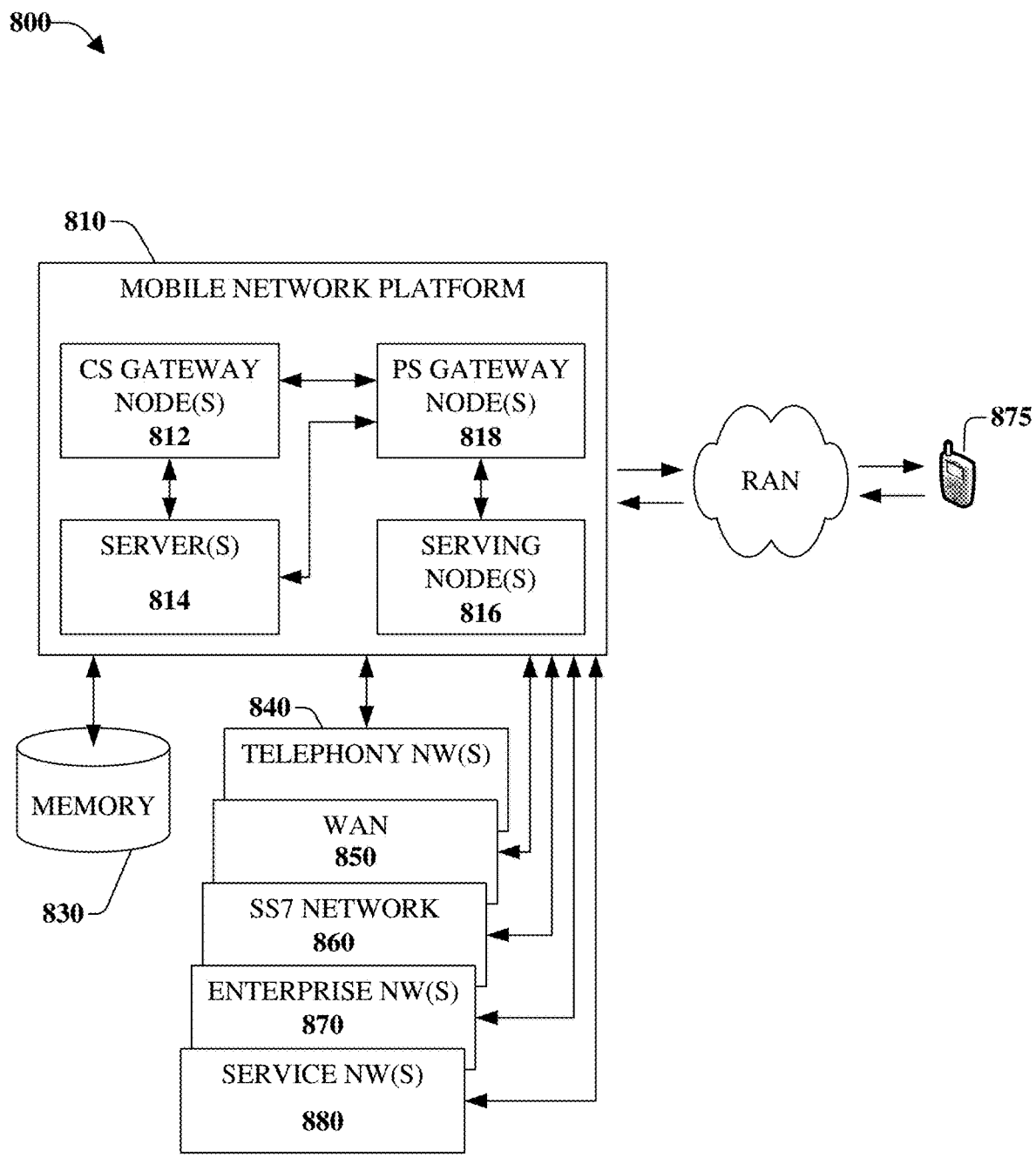
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
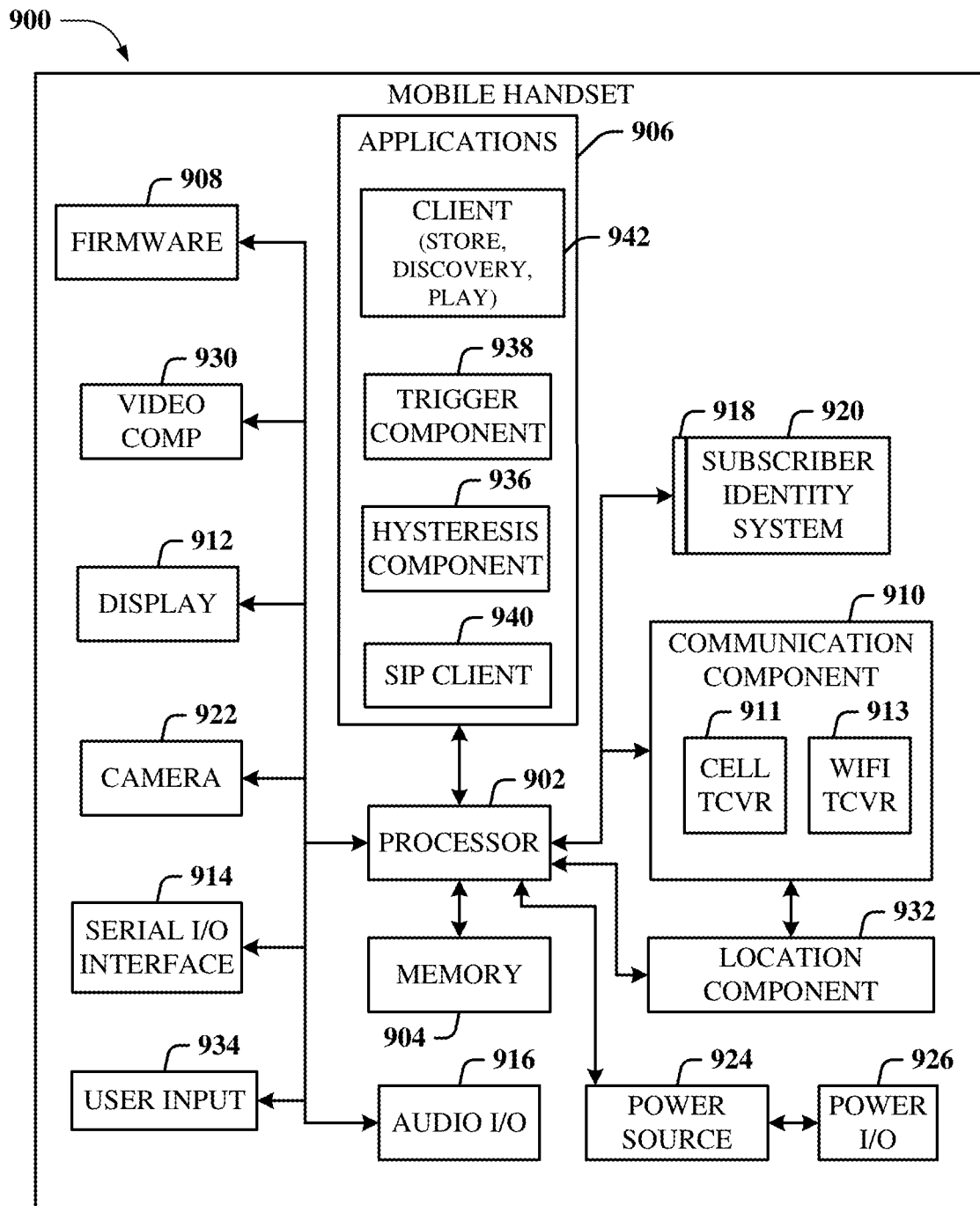
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
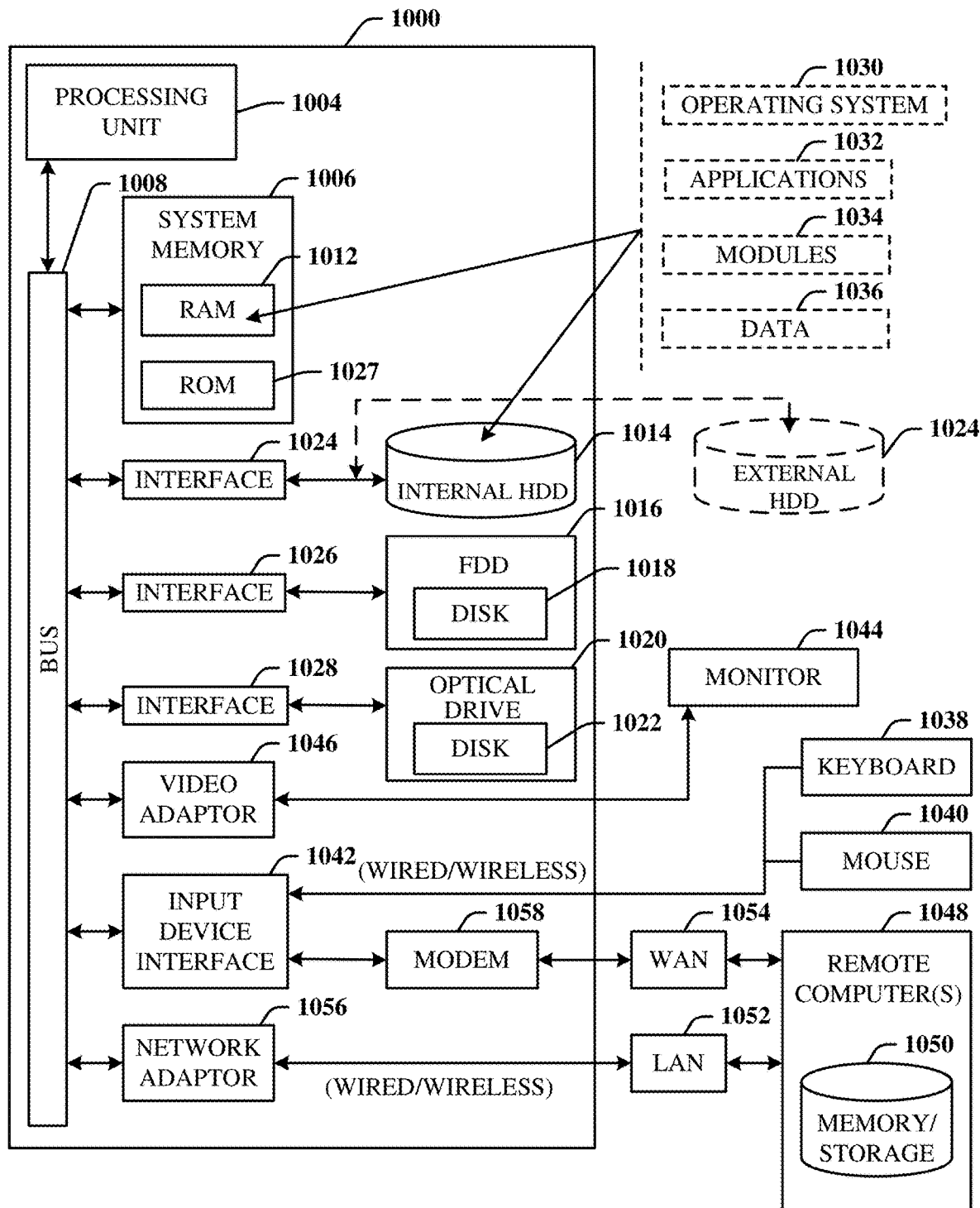
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so on), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a support device comprising a processor, a dedicated communication link with a remote support entity via a secure internet connection, wherein the remote support entity provides a support functionality that resolves a problem associated with an item;

based on a receipt of a request for an active session, establishing, by the support device, the active session with the remote support entity via the dedicated communication link;

receiving, by the support device, input data associated with the item, wherein the input data facilitates an identification of the problem associated with the item, and wherein the item is an appliance; and outputting, by the support device, an indication on the item based on the support device being in proximity of the item, wherein the indication is a beam of light, in a form of an arrow, output externally from the support device and onto a surface of the item, wherein the beam of light identifies a portion of the item, wherein an instruction related to the indication is controlled by the remote support entity and implemented by the support device, and wherein the support device is a stand-alone device that is dedicated to providing the support functionality for remote support entities.

2. The method of claim 1, wherein the facilitating comprises facilitating the dedicated communication link upon initial activation of the support device and prior to the establishing the active session.

3. The method of claim 2, wherein the facilitating comprises establishing a preconfigured wireless connectivity with the remote support entity.

4. The method of claim 1, wherein the indication is a first indication, and wherein the establishing comprises receiving a second indication that service associated with the item is requested and based on activation of a selector associated with a service request.

5. The method of claim 1, wherein the outputting comprises:

determining, by the support device, the proximity of the item to the support device being within a defined proximity; and transmitting, by the support device, a visible light on the item, wherein the visible light is an indication of feedback, from the remote support entity, and based on a resolution of the problem associated with the item.

6. The method of claim 1, wherein the request is a first request, wherein the receiving comprises receiving an image of at least a portion of the item, wherein the image is received in response to a second request for details related to the item, and wherein the second request is received from the remote support entity.

7. A device, comprising:

a housing, wherein the housing comprises:
a processor;
a memory that stores executable instructions that, when executed by the processor, facilitate performance of operations;
a modem that facilitates a preconfigured wireless connection with an external source, wherein the external source provides a service related to resolution of a problem associated with an item, wherein the external source is separate from the device, and wherein the item is an appliance;
a selection button that, upon activation, establishes a dedicated communication link with the external source via the preconfigured wireless connection;
a camera that captures an image of at least a portion of the item that relates to the problem; and
a light emitting diode projector that provides visual feedback related to the service for the resolution of the problem, wherein the visual feedback is indicated directly onto a surface of the item, wherein the visual feedback is controlled by the external source, wherein the housing is flexible and facilitates movement of the light emitting diode projector and the camera, and wherein the device is a stand-alone device that is dedicated for support functionalities associated with the item.

8. The device of claim 7, wherein the housing is waterproof, and wherein the camera is configured to capture underwater images.

9. The device of claim 7, further comprising:
a connector capable of being operatively connected to a power source and the item, wherein, when connected to the item, the connector facilitates conveyance of diagnostic information related to the item to the external source.

10. The device of claim 9, wherein removal of the connector from the item physically interrupts remote access to the device by the external source.

11. A support device, comprising:

a processor; and a memory that stores executable instructions that, when executed by the processor, facilitate performance of operations, wherein the operations comprise:

establishing a dedicated communication link with a remote support entity via a secure internet connection, wherein the remote support entity enables a support functionality that resolves an issue associated with an item;

based on a receipt of a request for an active session, establishing the active session with the remote support entity via the dedicated communication link;

receiving input data associated with the item, wherein the input data facilitates an identification of the issue associated with the item, and wherein the item is an appliance; and outputting an indication on the item based on the support device being in proximity of the item, wherein the indication is a beam of light, in a form of an arrow, output externally from the support device and onto a surface of the item, wherein the beam of light identifies a portion of the item, wherein an instruction related to the indication is controlled by the remote support entity and implemented by the support device, and wherein the support device is a stand-alone device that is dedicated to enabling the support functionality for remote support entities.

12. The support device of claim 11, wherein the operations further comprise establishing the dedicated communication link upon initial activation of the support device and prior to the establishing the active session.

13. The support device of claim 11, wherein the operations further comprise establishing a preconfigured wireless connectivity with the remote support entity.

14. The support device of claim 11, wherein the indication is a first indication, and wherein the operations further comprise receiving a second indication that service associated with the item is requested and based on activation of a selector associated with a service request.

15. The support device of claim 11, wherein the operations further comprise:
   determining the proximity of the item to the support device being within a defined proximity; and
   transmitting a visible light on the item, wherein the visible light is an indication of feedback, from the remote support entity, and based on a resolution of the issue associated with the item.

16. The support device of claim 11, wherein the request is a first request, wherein the receiving comprises receiving an image of at least a portion of the item, wherein the image is received in response to a second request for details related to the item, and wherein the second request is received from the remote support entity.

17. The support device of claim 11, wherein the beam of light is in response to feedback associated with the item and based on information received from the remote support entity, and wherein the information is related to support services for functionality of the item.

18. The support device of claim 11, wherein the receiving comprises receiving input data from a microphone.

19. The support device of claim 11, further comprising a flexible housing that encases a camera, wherein the flexible housing facilitates movement of the camera into different positions.

20. The support device of claim 11, further comprising a dedicated support button, wherein the operations further comprise preconfiguring the dedicated communication link with the remote support entity upon initial activation.

* * * * *